Sept. 13, 1960    J. F. DOYLE    2,952,397
BAGS, COMPOSITE MATERIAL AND METHOD OF MAKING
Filed Aug. 6, 1954
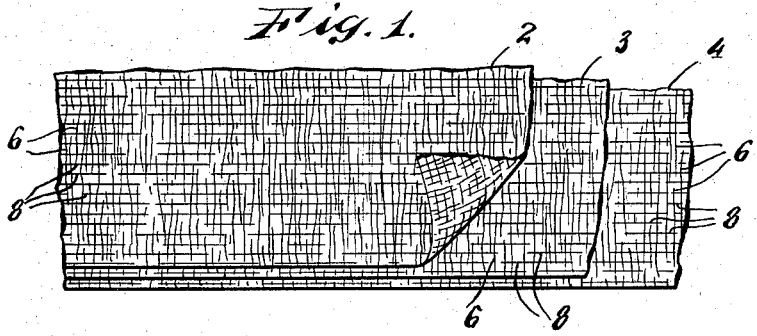
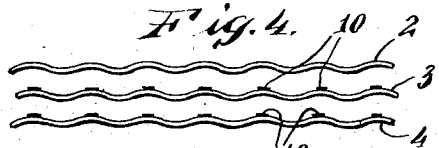
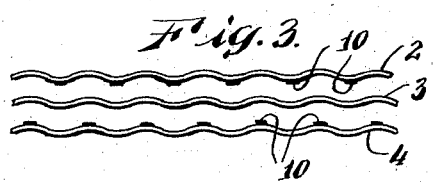
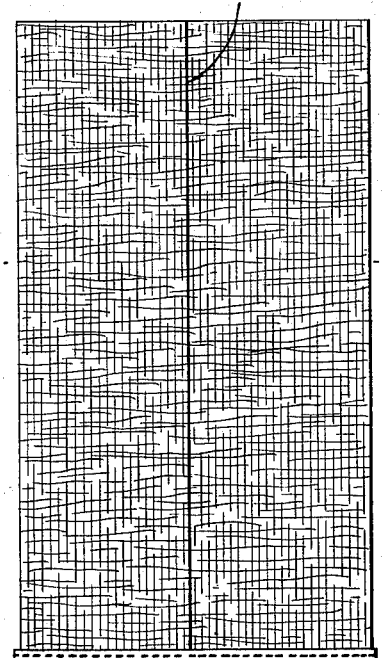
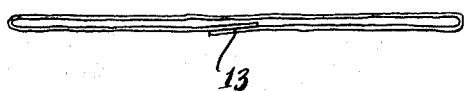
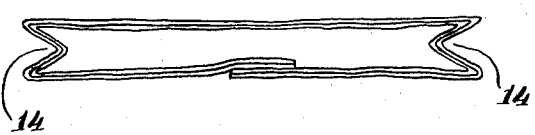
INVENTOR.
James F. Doyle
BY
ATTORNEYS.

United States Patent Office 2,952,397
Patented Sept. 13, 1960

2,952,397

BAGS, COMPOSITE MATERIAL AND METHOD OF MAKING

James F. Doyle, Jamaica, N.Y., assignor to Arkell Safety Bag Company, New York, N.Y., a corporation of New York Filed Aug. 6, 1954, Ser. No. 448,274

5 Claims. (Cl. 229—55)

The present invention relates to bags, and has special reference to bags of the type of the one described and claimed in the patent to Greene No. 2,314,876 dated March 30, 1943, and further relates to composite material and method of forming the same.

One of the objects of the invention is to provide a novel and improved bag of this type.

Another of the objects of the invention is to provide novel and improved composite material, and method of forming the same.

The several features of the invention, whereby the above mentioned and other objects may be attained, will be readily understood from the following description and accompanying drawings, in which:

Figure 1 is a plan view of my improved composite material in its preferred form;

Fig. 2 is a transverse sectional view, on an enlarged scale, taken on the line 2—2 of Fig. 1;

Fig. 3 is a similar view but with the plies separated and showing the manner of applying adhesive for securing the plies together;

Fig. 4 is a view similar to Fig. 3 by illustrating another manner of applying adhesive;

Fig. 5 is a similar view of a modified form;

Fig. 6 is a side elevation of my improved bag in its preferred form, the bag being shown of the non-gussetted type;

Fig. 7 is a transverse sectional view, partly diagrammatical, taken on the line 7—7 of Fig. 6;

Fig. 8 is a similar view of a gussetted bag; and

Fig. 9 is a transverse sectional view, on an enlarged scale, of the side seam of the bag.

My improved composite material may be formed of three webs 2, 3 and 4 of crinkled and corrugated paper, the crinkles 6 extending transversely, and the corrugations 8 extending longitudinally of the webs.

The webs are correspondingly crinkled and correspondingly corrugated, and are superposed on one another with the corrugations 6 generally in nested relation, and the crinkles 8 generally in non-nested relation. Previously to superposing the webs, lines of adhesive 10 are applied to the crests of the corrugations on the inner sides of certain of the webs so as to secure the webs together. Preferably only the crests of the crinkles of the corrugations are secured by the adhesive, the remaining portions or valleys of the crinkles being left unsecured.

In Fig. 3 the lines of adhesive 10 are shown applied to the crests of the corrugations on the inner sides of the outer webs 2 and 4, so that when the plies are brought together they are secured on those lines as shown in Fig. 1.

It will be noted that with this manner of applying the adhesive, the lines of adhesive are arranged in staggered relation which results in uniform flexibility and strength of the composite material.

In certain instances it may be desirable to secure the plies together as illustrated in Fig. 4, in which the lines of adhesive are initially applied to the crests of the crinkles on the corresponding sides of the webs 3 and 4.

It will be understood that the composite material may be made of any desired number of webs, and one or more of the webs may be made up of two plies which are secured together before crinkling and corrugating. In Fig. 5 the composite material is shown made up of two webs, each web being made up of two plies that are pasted together previously to crinkling and corrugating, and the two duplex webs secured together by adhesive 11 applied to the crests of the inner corrugations of one of the duplex webs as above described. The securing of the plies of these duplex webs together previously to crinkling and corrugating may be done by lightly spraying flexible adhesive between the plies, or they may be otherwise adhesively secured together in such a manner as not to materially reduce the flexibility of the sheets.

Where the material is to be used for making bags, the webs are preferably secured in overlapping relation transversely thereof as shown in Fig. 1.

The webs may be pasted and brought together as they are fed longitudinally by means of a bag tubing machine (not shown). As the advancing portion of the composite web thus formed approaches the tubing devices of the machine, adhesive 12 is applied to the inner sides of the overlapping margins on one longitudinal edge of the web so that, as the tube is formed, those margins are pasted to the outer sides of the corresponding margins on the other edge of the web to form a side seam 13 (Figs. 1 and 7).

As the flattened tube leaves the tubing devices it may be severed transversely into bag lengths by the usual severing devices of the machine.

The bags may be formed either without bellows folds or gussets as shown in Figs. 6 and 7, or with gussets 14 as shown in Fig. 8, the guessets being formed in the usual manner by the tubing machine.

One end of the bag tube may be closed in any suitable manner to form an open-mouthed bag, or both ends may be closed and a filling valve formed in the upper end of the bag.

In Fig. 6 of the drawings, one end of the bag is shown closed by means of the usual tape 16 folded over the end and secured by a line of stitching 18, but it will be understood that any other suitable means may be employed for closing one or both ends of the bag.

The webs are preferably crinkled by means of the usual water crepe or secondary process, and this operation and the corrugating may be performed by means of a machine such as that illustrated and described in the patent to McBean No. 2,124,582, dated July 26, 1938.

The crinkling of the webs may be such as to provide substantially 15% longitudinal stretchability of the bag, and the corrugations may be so formed as to provide substantially 8% circumferential stretchability of the bag. However, the longitudinal stretchability may vary from 10% to even 20% and the circumferential stretchability may vary from 6% to 15%, depending on the particular construction of bag desired. In certain instances it may be desirable to have the longitudinal and circumferential stretchability substantially equal, for example, from 10% to 20%.

The adhesive employed for securing the corrugations together, as above described, is preferably of a flexible kind such as an asphaltic rubber mixture, or it may be made essentially of rubber or latex. The adhesive should be of a kind that would not be materially affected by weather conditions such as to cause the adhesive to be brittle in cold weather and too fluid in hot weather. The adhesive should be uniformly applied to the corrugations throughout the area of the bag. The side seam 13 should also be secured by latex or other flexible adhesive.

The corrugations may be from approximately 2 to 4 to an inch, depending upon the amount of stretchability desired. The corrugations should be shallow, and should be left rounded or unflattened so they may expand and contact without fracturing or otherwise injuring the fibers of the paper.

Bags of this type are usually made of kraft paper of the thickness and strength desired. The bags may be made of any desired size, but they are especially adapted for containing from 50 to 100 pounds of finely divided material, such as milk solids, cement or the like.

The plies or sheets are secured together preferably only at the crests of the crinkles of the corrugations as above described which provides for maximum elasticity and flexibility throughout and the material is of cloth-like flexibility.

Despite the small amount of adhesive thus employed to secure the sheets together, it has been found that the sheets uniformly resist bursting strains in both directions throughout the area of the bag.

It has also been found that with my improved bag there is less breakage at the folded longitudinal edges of the bag, whether of the gussetted or non-gussetted type. The sewed seams are much more effectively cushioned by the material of the bag, and there is less breakage at the stitches.

The bag will withstand the rough handling to which such bags are frequently subjected much better than paper bags of this type in general commercial use.

What I claim is:

1. A bag made of composite material of the class described comprising a plurality of sheets of crinkled and corrugated paper arranged in superposed relation with the corrugations of the several sheets unflattened and shallow and arranged generally in nested relation and the crinkles of the several sheets arranged generally in non-nested relation, the crests of the corrugations of adjacent sheets being adhesively secured to the valleys of the corrugations of the other sheet, the corrugations of adjacent sheets being otherwise left unsecured, the crinkles in the several sheets extending circumferentially of the bag to provide for longitudinal stretchability, and the corrugations in the several sheets extending longitudinally of the bag to provide for circumferential stretchability.

2. A structure according to claim 1 in which at least one of the sheets comprises two plies that are crinkled and corrugated together, and are also adhesively secured together.

3. A structure according to claim 1 in which such securing the crinkles being only at the crests of the crinkles thereof, the valleys of the crinkles being unsecured.

4. A bag according to claim 1 in which the stretchability thereof is of the order of from 10 to 20 percent longitudinally and 6 to 20 percent circumferentially.

5. Composite material of the class described comprising a plurality of webs of crinkled and corrugated paper, the crinkles extending transversely and the corrugations extending longitudinally of the webs and being unflattened and shallow, the corrugations in the webs being generally in nested relation and the crinkles being generally in non-nested relation, and adhesive securing the crests of the corrugations of each web to the valleys of the corrugation of the adjacent web, the corrugations of adjacent webs being otherwise left unsecured.

References Cited in the file of this patent

UNITED STATES PATENTS

| | | |
|---|---|---|
| 1,032,789 | Swift | July 16, 1912 |
| 2,314,876 | Greene | Mar. 30, 1943 |
| 2,434,892 | Ulm | Jan. 20, 1948 |